(12) United States Patent
Furubayashi et al.

(10) Patent No.: US 10,598,335 B2
(45) Date of Patent: Mar. 24, 2020

(54) LIGHTING TOOL FOR VEHICLE

(71) Applicant: STANLEY ELECTRIC CO., LTD., Tokyo (JP)

(72) Inventors: Kazuya Furubayashi, Tokyo (JP); Takumi Kusano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/411,945

(22) Filed: May 14, 2019

(65) Prior Publication Data

US 2019/0353323 A1 Nov. 21, 2019

(30) Foreign Application Priority Data

May 17, 2018 (JP) ................... 2018-095192

(51) Int. Cl.
| | |
|---|---|
| *F21S 43/249* | (2018.01) |
| *F21V 8/00* | (2006.01) |
| *F21S 43/239* | (2018.01) |
| *F21S 43/245* | (2018.01) |

(52) U.S. Cl.
CPC ............ *F21S 43/249* (2018.01); *F21S 43/239* (2018.01); *F21S 43/245* (2018.01); *G02B 6/0018* (2013.01); *G02B 6/0046* (2013.01); *G02B 6/0068* (2013.01)

(58) Field of Classification Search
CPC ...... F21S 43/249; F21S 43/239; F21S 43/245; F21S 43/14; B60Q 1/2607; B60Q 2400/20; B60Q 1/00; F21W 2103/10; F21W 2103/20; G02B 6/002

See application file for complete search history.

(56) References Cited

U.S. PATENT DOCUMENTS

| | | | |
|---|---|---|---|
| 2005/0152141 | A1 | 7/2005 | Suzuki |
| 2015/0267895 | A1 | 9/2015 | Kono |
| 2018/0051858 | A1* | 2/2018 | Hatanaka ............... F21V 29/76 |
| 2018/0106448 | A1* | 4/2018 | Shiraishi .............. F21V 29/503 |
| 2019/0351814 | A1* | 11/2019 | Furubayashi ........ G02B 6/0031 |

FOREIGN PATENT DOCUMENTS

| | | |
|---|---|---|
| DE | 10 2014 205 994 A1 | 10/2015 |
| EP | 2857740 A1 | 4/2015 |
| JP | 2012-004004 A | 1/2012 |
| JP | 2014-075331 A | 4/2014 |

OTHER PUBLICATIONS

The extended European Search Report for the related European Patent Application No. 19174508.2 dated Oct. 25, 2019.

\* cited by examiner

*Primary Examiner* — Tracie Y Green
(74) *Attorney, Agent, or Firm* — Kenealy Vaidya LLP (57) ABSTRACT

In a lighting tool for a vehicle, a part of light emitted from a light source which is either one of a first light source and a second light source enters from an incident section which is one of a first incident section and a second incident section, passes through the light guide body at a side closer to a light guide section than an abutting section, and is emitted from another incident section toward another light source and then reflected by the another light source, and a part of light reflected by the another light source enters from the another incident section and then is reflected toward the light guide section by an inclined surface.

6 Claims, 6 Drawing Sheets

LIGHTING TOOL FOR VEHICLE

CROSS-REFERENCE TO RELATED APPLICATION

Priority is claimed on Japanese Patent Application No. 2018-095192, filed May 17, 2018, the content of which is incorporated herein by reference.

BACKGROUND OF THE INVENTION

Field of the Invention

The present invention relates to a lighting tool for a vehicle.

Description of Related Art

In the related art, as a lighting tool for a vehicle mounted on a vehicle, there is a lighting tool obtained by combining a light source such as a light emitting diode (LED) or the like and a light guide body having a rod shape, a plate shape, or the like (for example, see Japanese Unexamined Patent Application, First Publication No. 2012-4004 and Japanese Unexamined Patent Application, First Publication No. 2014-75331). In such a lighting tool for a vehicle, light emitted from the light source enters a light guide body from a base end side, the light is guided toward a tip side of the light guide body, the light reflected by a plurality of reflection cuts provided on a back surface side of the light guide body is emitted from a front face side of the light guide body, and thus, the light is emitted from the front face side of the light guide body.

In addition, in the lighting tool for a vehicle in recent years, emissions from light guide bodies is mutually performed by lights from light sources having different colored lights according to divergence of designs. As a combination of such lighting tools for a vehicle, for example, there is provided a combination of width indicators (position lamps) configured to emit white light and direction indicators (turn lamps) configured to emit orange light as lighting tools for a vehicle mounted on both corner sections of a front end side of the vehicle, a combination of taillights (tail lamps) configured to emit red light and direction indicators (turn lamps) configured to emit orange light as lighting tools for a vehicle mounted on both corner sections of a rear end side of the vehicle, or the like.

SUMMARY OF THE INVENTION

Incidentally, when the above-mentioned light guide bodies are made to emit light due to lights from the light sources having different colored lights, it is necessary to dispose the light sources having different colored lights separately and to mutually guide the lights toward the same direction after the lights from each of the light sources are made to enter the light guide bodies from different positions, respectively. However, in this case, not only a structure of positions (incident sections) into which lights emitted from the light sources enter becomes complicated, but also the size of the light guide body is increased.

In addition, when the lights are made to enter from different positions (incident sections) with each other, according to the difference in the optical paths of lights that enters from the each incident sections, a designing of the light guide body according to the difference in each of the optical paths is necessary. For example, when the light emitted from the light sources facing with each other enters from the incident sections provided on both sides of the light guide body in a thickness direction and is reflected in the same direction with each other by a pair of inclined surfaces that are inclined in opposite directions with each other, the light reflected by the pair of inclined surfaces is guided with the different optical paths of the light guide body in the thickness direction. In this case, the thickness of the light guide body should be increased (specifically, doubled), which leads to an increase in size of the light guide body.

An aspect of the present invention is directed to providing a lighting tool for a vehicle capable of efficiently guiding light entering from different positions in the same optical path while achieving reduction in thickness of a light guide body.

In order to accomplish the above-mentioned objects, the present invention provides the following means

[1] A lighting tool for a vehicle including:
a first light source and a second light source disposed in a state facing each other; and
a light guide body configured to guide light from the first light source and the second light source in a same direction,
wherein the light guide body has:
a first incident section and a second incident section disposed to face the first light source and the second light source, respectively, and into which light emitted from the first light source and the second light source enters, respectively;
a reflection section that includes a pair of inclined surfaces disposed between the first incident section and the second incident section and inclined in opposite directions with each other and an abutting section where the pair of inclined surfaces abut with each other, and that is configured to reflect the light entering from the first incident section and the second incident section in a same direction using the pair of inclined surfaces; and
a light guide section configured to guide the light reflected by the reflection section, and
a part of the light emitted from a light source which is either one of the first light source and the second light source enters the light guide body from an incident section which is one of the first incident section and the second incident section, passes through the light guide body at a side closer to the light guide section than the abutting section, and is emitted from another incident section, which is the another one of the first incident section and the second incident section, toward another light source, which is the another one of the first light source and the second light source, and then reflected by the another light source, and a part of the light reflected by the another light source enters from the another incident section and then is reflected toward the light guide section by the inclined surface.

[2] The lighting tool for a vehicle according to the above-mentioned [1], wherein the abutting section is disposed on the side closer to the light guide section with respect to an optical axis of the light emitted from the first light source and the second light source.

[3] The lighting tool for a vehicle according to the above-mentioned [1] or [2], wherein the first incident section and the second incident section cause the light radially emitted from the first light source and the second light source to enter the light guide body while being parallelized or condensed.

[4] The lighting tool for a vehicle according to any one of the above-mentioned [1] to [3], wherein the light guide body makes a light emitting section provided on a front face side of the light guide section to emit light by emitting the light reflected by a plurality of reflection cuts provided on a back surface side of the light guide section from the front face side of the light guide section to the outside while guiding the light reflected by the reflection section into the light guide section.

[5] The lighting tool for a vehicle according to any one of the above-mentioned [1] to [4], wherein the plurality of first light sources and the plurality of second light sources are provided side by side while facing each other in a direction crossing a direction of advance of the light reflected from the reflection section toward the light guide section.

[6] The lighting tool for a vehicle according to any one of the above-mentioned [1] to [5], wherein the first light source and the second light source emit different colored lights.

As described above, according to the aspect of the present invention, it is possible to provide a lighting tool for a vehicle capable of efficiently guiding lights entering from different positions with each other in the same optical path while achieving a decrease in thickness of a light guide body.

DETAILED DESCRIPTION OF THE INVENTION

Hereinafter, an embodiment of the present invention will be described in detail with reference to the accompanying drawings.

Further, in the drawings used in the following description, for the convenience of easy understanding of components, scales of dimensions may be shown differently depending on the components, and a dimensional ratio or the like of the components may not necessarily be the same as the actual.

For example, a lighting tool 1 for a vehicle shown in FIG. 1 to FIG. 11 will be described as the embodiment of the present invention.

Figure 1:
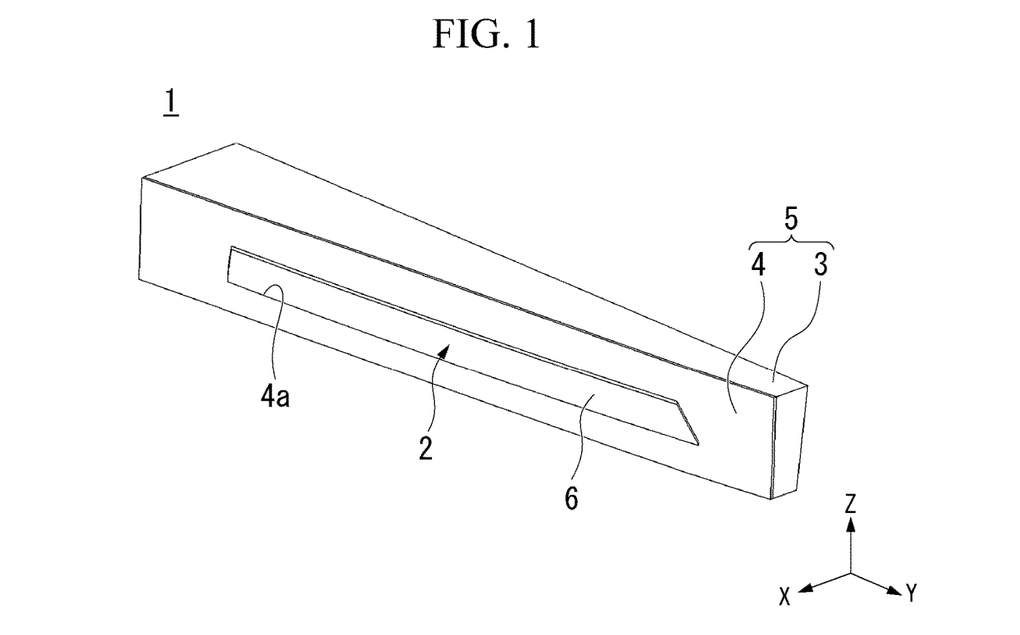
FIG. 1 is a perspective view showing a configuration of a lighting tool for a vehicle according to an embodiment of the present invention.
Figure 2:
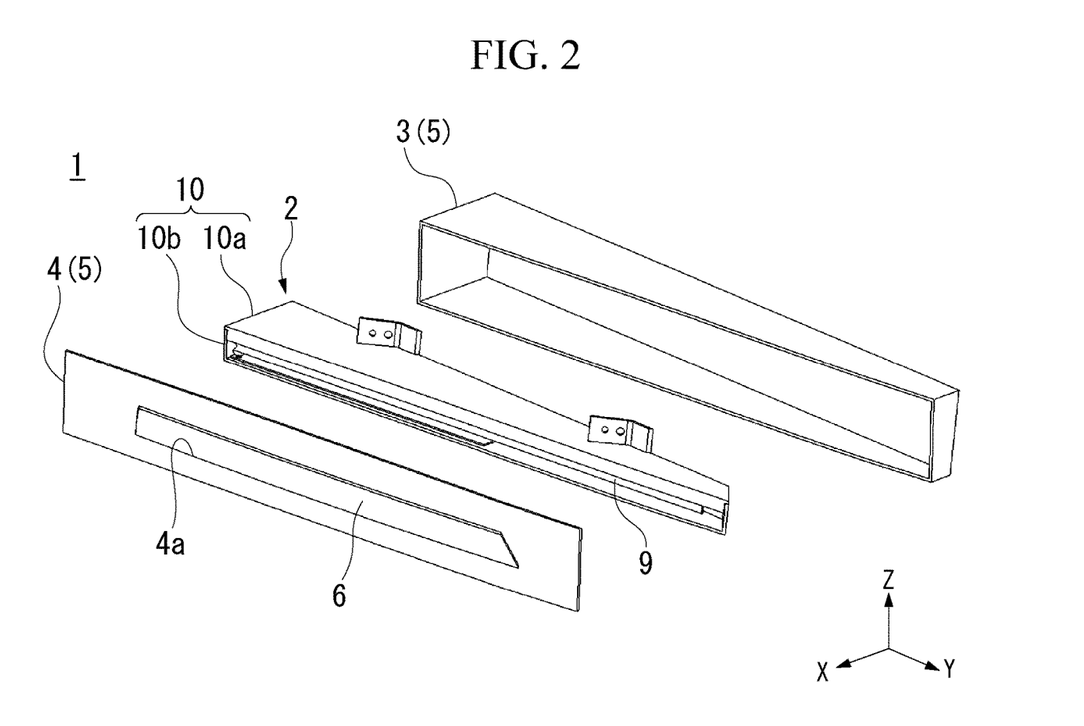
FIG. 2 is an exploded perspective view showing the configuration of the lighting tool for a vehicle shown in FIG. 1.
Figure 3:
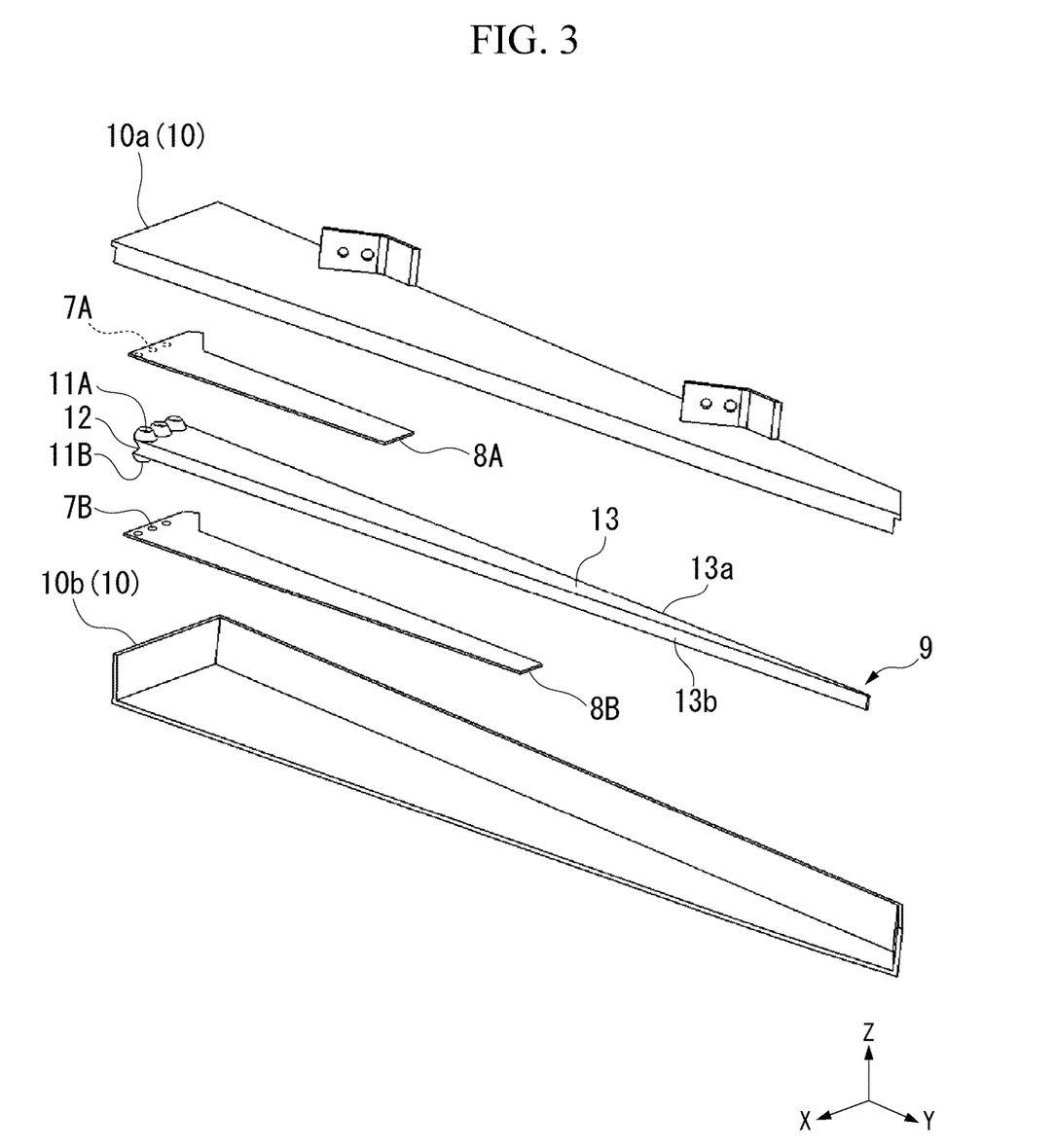
FIG. 3 is an exploded perspective view showing a configuration of a lighting tool unit included in the lighting tool for a vehicle shown in FIG. 2.
Figure 4:
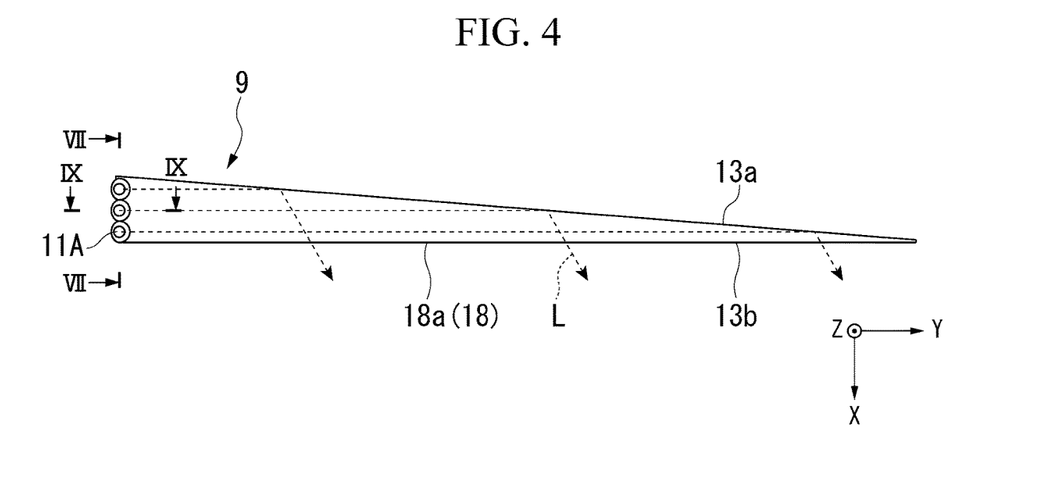
FIG. 4 is a plan view showing a configuration of a light guide body included in the lighting tool unit shown in FIG. 3.

Further, FIG. 1 is a perspective view showing a configuration of the lighting tool 1 for a vehicle. FIG. 2 is an exploded perspective view showing a configuration of the lighting tool 1 for a vehicle. FIG. 3 is an exploded perspective view showing a configuration of a lighting tool unit 2 included in the lighting tool 1 for a vehicle. FIG. 4 is a plan view showing a configuration of a light guide body 9 included in the lighting tool unit 2.

Figure 5:
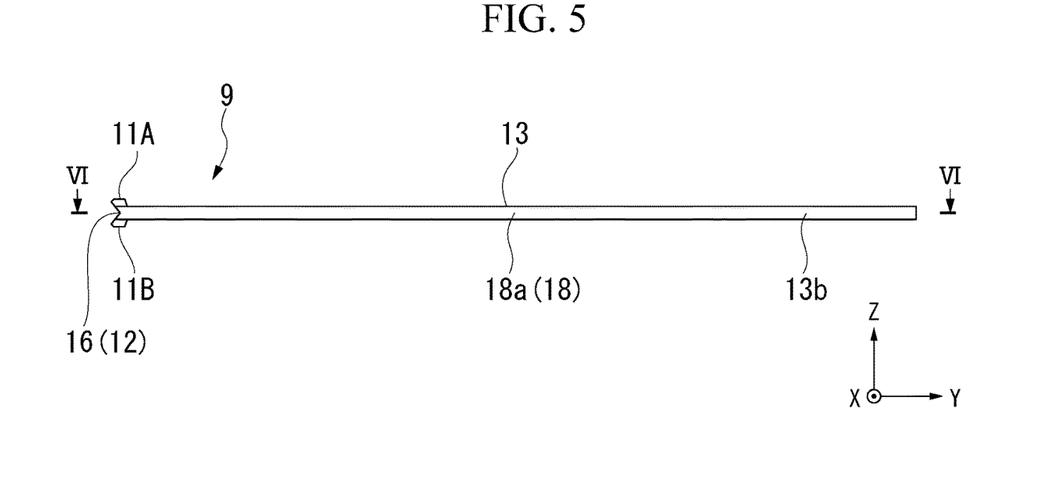
FIG. 5 is a front view showing a configuration of the light guide body included in the lighting tool unit shown in FIG. 3.
Figure 6:
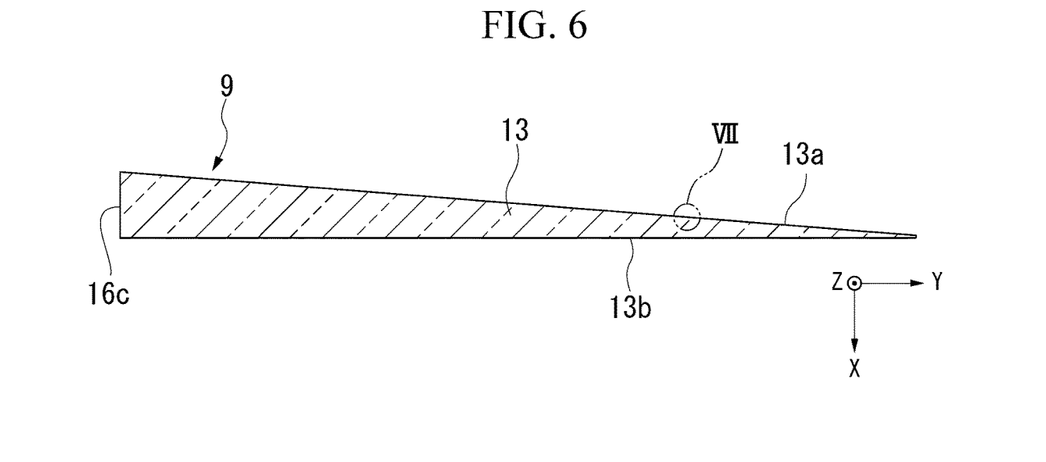
FIG. 6 is a cross-sectional view of the light guide body taken along line segment VI-VI shown in FIG. 5.
Figure 7:
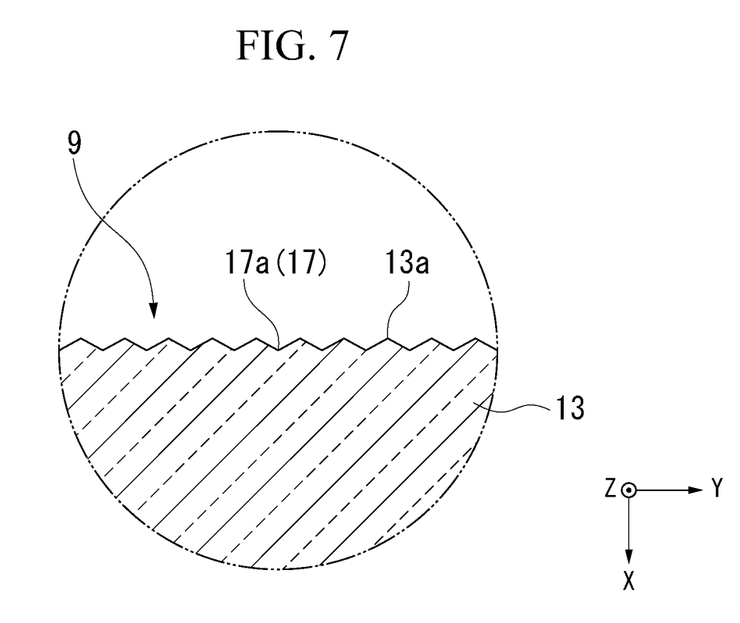
FIG. 7 is an enlarged cross-sectional view of an enclosed portion VII shown in FIG. 6 of the light guide body.
Figure 8:
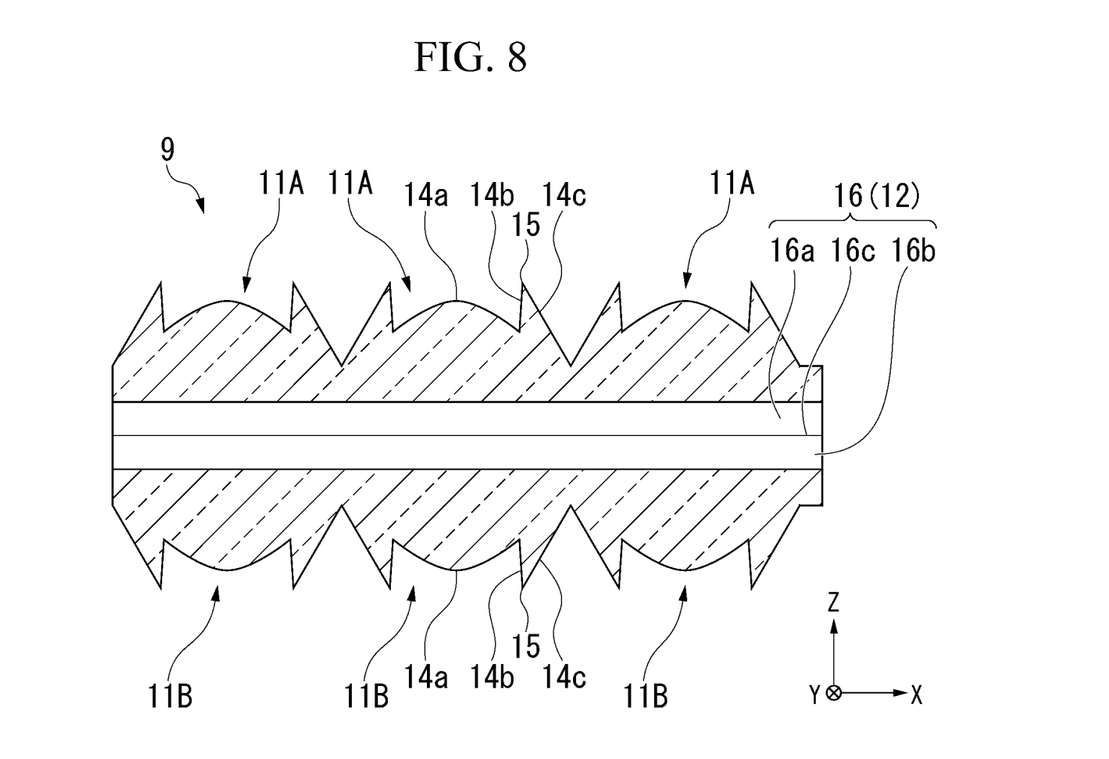
FIG. 8 is a cross-sectional view of the light guide body taken along line segment VIII-VIII shown in FIG. 4.
Figure 9:
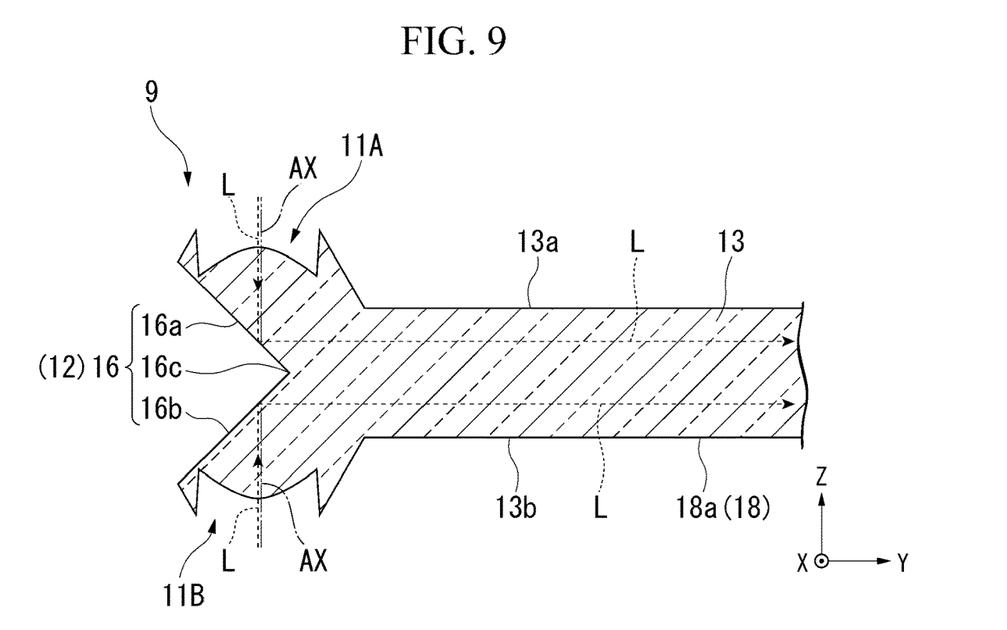
FIG. 9 is a cross-sectional view of the light guide body taken along line segment IX-IX shown in FIG. 4.
Figure 10:
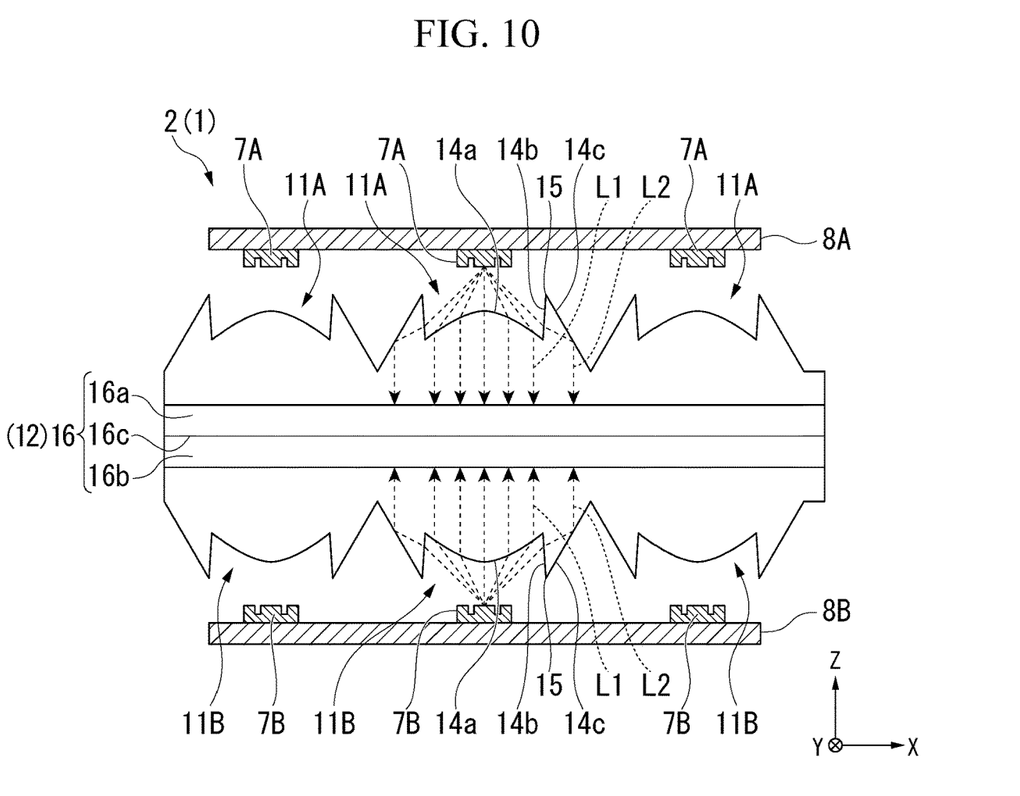
FIG. 10 is a cross-sectional view showing an optical path of light emitted from a first light source when seen in a direction shown in FIG. 8.
Figure 11:
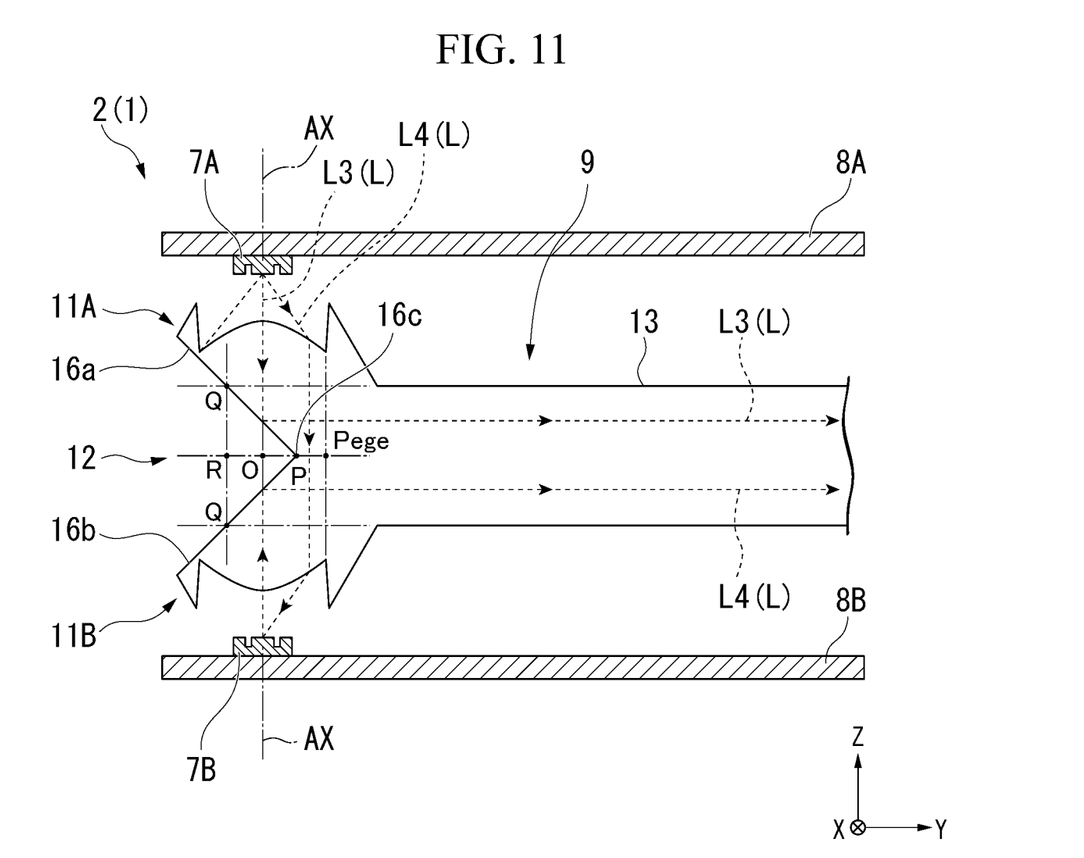
FIG. 11 is a cross-sectional view showing an optical path of light emitted from the first light source when seen in a direction shown in FIG. 9.

FIG. 5 is a front view showing a configuration of the light guide body 9 included in the lighting tool unit 2. FIG. 6 is a cross-sectional view of the light guide body 9 taken along line segment VI-VI shown in FIG. 5. FIG. 7 is an enlarged cross-sectional view of an enclosed portion VII shown in FIG. 6 of the light guide body 9. FIG. 8 is a cross-sectional view of the light guide body 9 taken along line segment VIII-VIII shown in FIG. 4. FIG. 9 is a cross-sectional view of the light guide body 9 taken along line segment IX-IX shown in FIG. 4. FIG. 10 is a cross-sectional view showing an optical path of light L emitted from a first light source 7A when seen in a direction shown in FIG. 8. FIG. 11 is a cross-sectional view showing an optical path of light L emitted from the first light source 7A when seen in a direction shown in FIG. 9.

In addition, in the following drawings, an XYZ orthogonal coordinate system is set, an X-axis direction indicates a forward/rearward direction (a lengthwise direction) with respect to the lighting tool 1 for a vehicle, a Y-axis direction indicates a leftward/rightward direction (a widthwise direction) with respect to the lighting tool 1 for a vehicle, and a Z-axis direction indicates an upward/downward direction (a height direction) with respect to the lighting tool 1 for a vehicle.

For example, the lighting tool 1 for a vehicle of the embodiment is mounted on each of both corner sections of a front end side (in the embodiment, a corner section on a left front end side) of a vehicle (not shown), and constituted by a position and turn lamp obtained by combining a width indicator (a position lamp) configured to emit white light and a direction indicator (a turn lamp) configured to blink emission of orange light.

Specifically, as shown in FIG. 1 and FIG. 2, the lighting tool 1 for a vehicle of the embodiment includes the lighting tool unit 2 that functions as a position and turn lamp. The lighting tool unit 2 is disposed inside a lighting body 5 constituted by a housing 3 having a front surface (a front face) that is open and a lens cover 4 configured to close a front surface side of the housing 3 and having an opening section 4a corresponding to the lighting tool unit 2. In addition, a transparent outer lens 6 is attached to the opening section 4a of the lens cover 4.

As shown in FIG. 2 and FIG. 3, the lighting tool unit 2 includes a plurality of (in the embodiment, three) first light sources 7A and a plurality of (in the embodiment, three) second light sources 7B, a first circuit board 8A and a second circuit board 8B, the light guide body 9, and a bracket 10.

The plurality of first light sources 7A are constituted by LEDs configured to emit white light (hereinafter, simply referred to as light) as light sources for a position lamp. In addition, a high output (high brightness) type (for example, an SMD LED or the like) for vehicle illumination is used as the LED. The plurality of first light sources 7A are mounted on a lower surface side of the first circuit board 8A, on which a driving circuit configured to drive the LED is provided, side by side at equal intervals in a forward/rearward direction. Accordingly, the plurality of first light sources 7A emit light L downward radially.

The plurality of second light sources 7B are constituted by LEDs configured to emit orange light (hereinafter, simply referred to as light) as light sources for a turn lamp. In addition, a high output (high brightness) type (for example, an SMD LED or the like) for vehicle illumination is used as the LED. The plurality of second light sources 7B are mounted on an upper surface side of the second circuit board 8B, on which a driving circuit configured to drive the LED is provided, side by side at equal intervals in the forward/rearward direction. Accordingly, the plurality of second light sources 7B emit the light upward radially.

The first circuit board 8A and the second circuit board 8B are disposed in a state in which the light guide bodies 9 are sandwiched therebetween such that the plurality of first light sources 7A and the plurality of second light sources 7B face each other. That is, the plurality of first light sources 7A and the plurality of second light sources 7B are provided to be arranged while facing each other in a direction crossing a direction of advance of light reflected from a reflection section 12 of the light guide body 9 toward a light guide section 13, which will be described below.

As shown in FIG. 4 to FIG. 9, the light guide body 9 is formed in a substantially triangular flat plate shape as a whole as an inner lens, and a main surface thereof is disposed in a direction parallel to a horizontal direction. Further, a material having a higher refractive index than that of air such as a transparent resin that is transparent with respect to the lights emitted from the light sources 7A and 7B, for example, polycarbonate, acryl, or the like, glass, or the like, may be used in the light guide body 9.

The light guide body 9 has a plurality of (in the embodiment, three) first incident sections 11A and a plurality of (in the embodiment, three) second incident sections 11B, the reflection section 12 and the light guide section 13.

The plurality of first incident sections 11A are provided side by side at equal intervals in the forward/rearward direction along an end portion of an upper surface of the light guide body 9 on a base end side to face the plurality of first light sources 7A. The first incident section 11A has a first condensing incident surface 14a having a convex surface shape, disposed at a center of a portion facing the first light sources 7A and into which a part of the light L emitted from the first light sources 7A enters, a second condensing incident surface 14b disposed on an inner circumferential side of a protrusion 15 protruding from a position surrounding the first condensing incident surface 14a toward the first light sources 7A and into which a part of the light L emitted from the first light sources 7A enters, and a condensing reflection surface 14c disposed on an outer circumferential side of the protrusion 15 and configured to reflect the light L entering from the second condensing incident surface 14b toward the reflection section 12.

The plurality of second incident sections 11B are provided to be arranged side by side at equal intervals in the forward/rearward direction along an end portion of a lower surface of the light guide body 9 on a base end side to face the plurality of second light sources 7B. The second incident sections 11B have the same configuration (shape) as that of the first incident sections 11A.

That is, the second incident section 11B has a first condensing incident surface 14a having a convex surface shape, disposed at a center of a portion facing the second light source 7B and into which a part of the light L emitted from the second light sources 7B enters, a second condensing incident surface 14b disposed at an inner circumferential side of the protrusion 15 protruding from a position surrounding the first condensing incident surface 14a toward the second light sources 7B and into which a part of the light L emitted from the second light sources 7B enters, and a condensing reflection surface 14c disposed on an outer circumferential side of the protrusion 15 and configured to reflect the light L entering from the second condensing incident surface 14b toward the reflection section 12.

In the first incident sections 11A and the second incident sections 11B, as shown in FIG. 10, the light L1 entering from the first condensing incident surface 14a among the light L emitted from the first light sources 7A and the second light sources 7B is condensed to the vicinity of the optical axis. Meanwhile, the light L2 entering from the second condensing incident surface 14b is condensed to the vicinity of the optical axis through reflection (total reflection) by the condensing reflection surface 14c.

Accordingly, in the first incident sections 11A and the second incident sections 11B, the light L (L1 and L2) radially emitted from the first light sources 7A and the second light sources 7B can enter the protrusion 15 (the light guide body 9) while being parallelized or condensed.

As shown in FIG. 9, the reflection section 12 is disposed between the plurality of first incident sections 11A and the plurality of second incident sections 11B, i.e., on an end portion of the light guide body 9 on a base end side. The reflection section 12 has a pair of inclined surfaces 16a and 16b inclined in opposite directions, and an abutting section 16c where the pair of inclined surfaces 16a and 16b abut with each other.

The pair of inclined surfaces 16a and 16b are provided to be inclined in opposite directions toward the light guide section 13 at an angle of 45° with respect to an optical axis AX of the light L emitted from the first light sources 7A and the second light sources 7B. Accordingly, the pair of inclined surfaces 16a and 16b constitute a V-shaped groove section 16 that is formed by cutting out an end portion of the light guide body 9 on a base end side in the forward/rearward direction.

The abutting section 16c is disposed on a bottom section of the groove section 16. In addition, the abutting section 16c is disposed on the side closer to the light guide section 13 with respect to the optical axis AX of the light L emitted from the first light sources 7A and the second light sources 7B.

In the embodiment, as shown in FIG. 11, provided that a position at which the optical axis AX of the light L and a center axis line of the light guide section 13 cross each other is referred to as a point O, a position of the abutting section 16c is referred to as a point P, a position at which a horizontal line along a main surface (an upper surface and a lower surface) of the light guide section 13 and the inclined surfaces 16a and 16b cross each other is referred to as a point Q, and a position at which a vertical line parallel to the optical axis AX of the light L passing through the point Q and a center axis line of the light guide section 13 cross each other is referred to as a point R, a length of a line segment OP and a length of a line segment OR are equal to each other (OP=OR).

In addition, a position of the point P (the abutting section 16c) shifted from the point O toward the light guide section 13 can be made between a boundary between the first condensing incident surface 14a and the second condensing incident surface 14b and a position (the point Pege) at which a vertical line parallel to the optical axis AX and a center axis line of the light guide section 13 cross. Further, the line segment OP is preferably within a range of 0.8 to 1.2 when OP=OR is set as 1.

Further, a shape of the abutting section 16c is not limited to a peak shape in which the pair of inclined surfaces 16a and 16b are joined at an acute angle (a right angle), and may have a planar shape in which an abutting portion between the pair of inclined surfaces 16a and 16b is flattened, or a curved shape in which an abutting portion between the pair of inclined surfaces 16a and 16b is rounded.

In the reflection section 12, the light L entering from the first incident sections 11A and the second incident sections 11B is reflected in the same direction toward the light guide section 13 by the pair of inclined surfaces 16a and 16b.

The light guide section 13 has a substantially triangular flat plate shape in which back surface 13a and the front face 13b are brought together on a tip side when a back surface 13a thereof is inclined toward a front face 13b from a base end side to a tip side of the light guide body 9.

In the light guide body 9, light is emitted from a light emitting section 18 provided on a front face side of the light guide section 13 by emitting the light L reflected by a plurality of reflection cuts 17 provided on the back surface 13a side of the light guide section from the front face 13b side of the light guide section 13 toward the outside while guiding the light L reflected by the reflection section 12 into the light guide section 13.

The plurality of reflection cuts 17 may be configured to reflect the light entering the back surface 13a of the light guide section 13 at an angle less than a critical angle with respect to the front face 13b of the light guide section 13, and shapes, sizes, numbers thereof, or the like, are not particularly limited. For example, as enlarged and shown in FIG. 7, the reflection cuts 17 of the embodiment may be configured by periodically arranging substantially V-shaped groove sections 17a obtained by cutting out the back surface 13a of the light guide section 13 in the upward/downward direction.

As shown in FIG. 4 to FIG. 6, the light emitting section 18 has a light emitting surface 18a disposed at positions corresponding to the plurality of reflection cuts 17 on the front face 13b side of the light guide section 13. In the light emitting section 18, light can be substantially uniformly emitted from the light emitting surface 18a by the light reflected by the plurality of reflection cuts 17.

As shown in FIG. 2 and FIG. 3, the bracket 10 is configured by an upper case 10a and a lower case 10b, front surface (front face) sides of which are open. The bracket 10 is configured by confronting the upper case 10a and the lower case 10b with each other such that the light guide body 9 is sandwiched therebetween in the upward/downward direction in a state in which the first circuit board 8A is attached to the upper case 10a and the second circuit board 8B is attached to the lower case 10b. The lighting tool unit 2 is attached to an inside of the housing 3 via the bracket 10 by a fastening screw.

Further, a configuration in which a reflector (not shown) facing the back surface 13a of the light guide section 13 is provided may be configured inside the bracket 10. Accordingly, the light emitted from the back surface 13a of the light guide section 13 to the outside can be reflected by the reflector and can enter the inside from the back surface 13a of the light guide section 13 again.

Incidentally, in the lighting tool 1 for a vehicle of the embodiment, as shown in FIG. 11, the light L emitted from a light source (the first light source 7A) which is either one of the first light source 7A and the second light source 7B enters from an incident section (the first incident section 11A) which is either one of the first incident section 11A and the second incident section 11B.

Light L3, which is a part of the light L entering from the first incident sections 11A, is reflected toward the light guide section 13 by the inclined surface 16a. In addition, light L4, which is a part of the light L entering from the first incident sections 11A, passes through on a side closer to the light guide section 13 than the abutting section 16c with respect to an optical axis AX of the light L emitted from the first light source 7A and the second light source 7B, is emitted from another incident section (the second incident section 11B) toward another light source (the second light source 7B), and then, is reflected by the second light sources 7B.

Here, surfaces of the LED that configure the first light sources 7A and the second light sources 7B configure diffusion reflection surfaces that reflect the light L4 entering the surfaces of the LED while diffusing the light L4. Accordingly, a part of the light L4 reflected by the second light sources 7B enters from the second incident sections 11B, and then, is reflected toward the light guide section 13 by the inclined surface 16b. Accordingly, the light L (L3, L4) emitted from the first light sources 7A is guided to the entire region of the light guide section 13 in the thickness direction.

Similarly, in the lighting tool 1 for a vehicle of the embodiment, while not shown, the light L3, which is a part of the light L emitted from the second light sources 7B, enters from the second incident sections 11B and is reflected toward the light guide section 13 by the inclined surface 16b. In addition, the light L4, which is a part of the light L emitted from the second light sources 7B, enters from the second incident sections 11B, passes through on a side closer to the light guide section 13 with respect to the abutting section 16c, is emitted from the second incident sections 11B toward the first light sources 7A and then reflected by the first light sources 7A, and a part of the light L4 reflected by the first light sources 7A enters from the first incident sections 11A and then is reflected toward the light guide section 13 by the inclined surface 16b. Accordingly, like the light L (L3, L4) emitted from the first light sources 7A, the light L (L3, L4) emitted from the second light sources 7B is guided to the entire region of the light guide section 13 in the thickness direction.

As described above, in the lighting tool 1 for a vehicle of the embodiment, the light L emitted from the first light sources 7A and the second light sources 7B can be guided through the same optical path in the light guide section 13 (the light guide body 9) in the thickness direction without increasing the thickness of the light guide section 13 (the light guide body 9).

Accordingly, in the lighting tool 1 for a vehicle of the embodiment, the light entering from different positions (the first incident sections 11A and the second incident sections 11B) can be efficiently guided with the same optical path while achieving a decrease in thickness of the light guide body 9.

In addition, in the lighting tool 1 for a vehicle of the embodiment, even when the light emitting section 18 of the light guide body 9 is made to emit light with the light from the first light sources 7A and the second light sources 7B having different colored lights, a decrease in size of the light guide body 9 can be achieved without complicating configurations (shapes) of the first incident sections 11A and the second incident sections 11B.

Further, the present invention is not particularly limited to the embodiment and various modifications may be made without departing from the scope of the present invention.

For example, while the configuration constituted by the position and turn lamp obtained by combining the width indicator (the position lamp) configured to emit blinking white light and the direction indicator (the turn lamp) configured to blink orange light has been exemplified as the lighting tool 1 for a vehicle mounted on each of both corner sections of the front end side of the vehicle in the embodiment, the present invention may also be applied to a lighting tool constituted by a tail and turn lamp obtained by combining a taillight (a tail lamp) configured to emit red light and a direction indicator (a turn lamp) configured to blink orange light as a lighting tool for a vehicle mounted on each of both corner sections of a rear end side of the vehicle.

Further, according to regulations in every country, it is possible to keep the position lamp or the tail lamp lighting and to turn off the position lamp or the tail lamp during blinking (lighting) of the turn lamp.

In addition, while the configuration in which the plurality of first light sources 7A emit white light and the plurality of second light sources 7B emit orange light has been exemplified in the embodiment, there is no particularly limitation to such a configuration. For example, a configuration in which, among the plurality of first light sources 7A, the first light sources 7A configured to emit white light and the first light sources 7A configured to emit orange light are disposed by being alternately arranged, and among the plurality of first light sources 7B, the second light sources 7B configured to emit white light and the second light sources 7B configured to emit orange light are disposed by being alternately arranged may be provided. Further, a configuration in which the first light sources 7A and the second light sources 7B disposed facing each other emit different colored lights may be provided.

In addition, while a case in which the first light sources 7A and the second light sources 7B having different colored lights are used has been exemplified in the embodiment, the present invention may be applied to the lighting tool for a vehicle using the first light sources 7A and the second light sources 7B having the same colored light. In this case, emission with a large light quantity becomes possible while achieving a decrease in thickness of the light guide body 9.

In addition, when the first light source 7A and the second light source 7B having the same colored light are used in the lighting tool for a vehicle to which the present invention is applicable, for example, the present invention can be widely applied to a lighting tool for a vehicle such as a headlight (a head lamp) for a vehicle, a width indicator (a position lamp), an auxiliary headlight (a subsidiary head lamp), a front (rear) fog light (fog lamp), a daytime running lamp (DRL), a lid lamp, a taillight (a tail lamp), a brake lamp (a stop lamp), a back lamp, a direction indicator (a winker lamp), or the like.

In addition, for example, in addition to the above-mentioned LED, a light emitting element such as a laser diode (LD) or the like can be used for the first light source 7A and the second light source 7B as long as light is emitted radially. In addition, a color of light emitted from the light emitting element can also be appropriately changed to, for example, white light, red light, orange light, or the like, according to uses thereof.

In addition, while the case in which the light guide body 9 having the above-mentioned substantially triangular plate shape is used has been exemplified in the lighting tool 1 for a vehicle, a shape or the like of the light guide body 9 can be appropriately changed according to designs or the like of actual vehicles.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting tool for a vehicle comprising:
   a first light source and a second light source disposed in a state facing each other; and
   a light guide body configured to guide light from the first light source and the second light source in a same direction,
   wherein the light guide body has:
   a first incident section and a second incident section disposed to face the first light source and the second light source, respectively, and into which light emitted from the first light source and the second light source enters, respectively;
   a reflection section that comprises a pair of inclined surfaces disposed between the first incident section and the second incident section and inclined in opposite directions with each other and an abutting section where the pair of inclined surfaces abut with each other, and that is configured to reflect the light entering from the first incident section and the second incident section in a same direction using the pair of inclined surfaces; and
   a light guide section configured to guide the light reflected by the reflection section, and
   a part of the light emitted from a light source which is either one of the first light source and the second light source enters the light guide body from an incident section which is one of the first incident section and the second incident section, passes through the light guide body at a side closer to the light guide section than the abutting section, and is emitted from another incident section, which is the another one of the first incident section and the second incident section, toward another light source, which is the another one of the first light source and the second light source, and then reflected by the another light source, and a part of the light reflected by the another light source enters from the another incident section and then is reflected toward the light guide section by the inclined surface.

2. The lighting tool for a vehicle according to claim 1, wherein the abutting section is disposed on the side closer to the light guide section with respect to an optical axis of the light emitted from the first light source and the second light source.

3. The lighting tool for a vehicle according to claim 1, wherein the first incident section and the second incident section cause the light radially emitted from the first light source and the second light source to enter the light guide body while being parallelized or condensed.

4. The lighting tool for a vehicle according to claim 1, wherein the light guide body makes a light emitting section provided on a front face side of the light guide section to emit light by emitting the light reflected by a plurality of reflection cuts provided on a back surface side of the light guide section from the front face side of the light guide section to the outside while guiding the light reflected by the reflection section into the light guide section.

5. The lighting tool for a vehicle according to claim 1, wherein the plurality of first light sources and the plurality of second light sources are provided side by side while facing each other in a direction crossing a direction of advance of the light reflected from the reflection section toward the light guide section.

6. The lighting tool for a vehicle according to claim 1, wherein the first light source and the second light source emit different colored lights.

\* \* \* \* \*